Oct. 6, 1964 — H. A. WEBER, SR — 3,151,872
CHILD'S ROCKING VEHICLE WITH FIGURE SIMULATION
Original Filed Feb. 15, 1960 — 2 Sheets-Sheet 1

INVENTOR.
HARM A. WEBER, SR.
BY
ATTORNEYS.

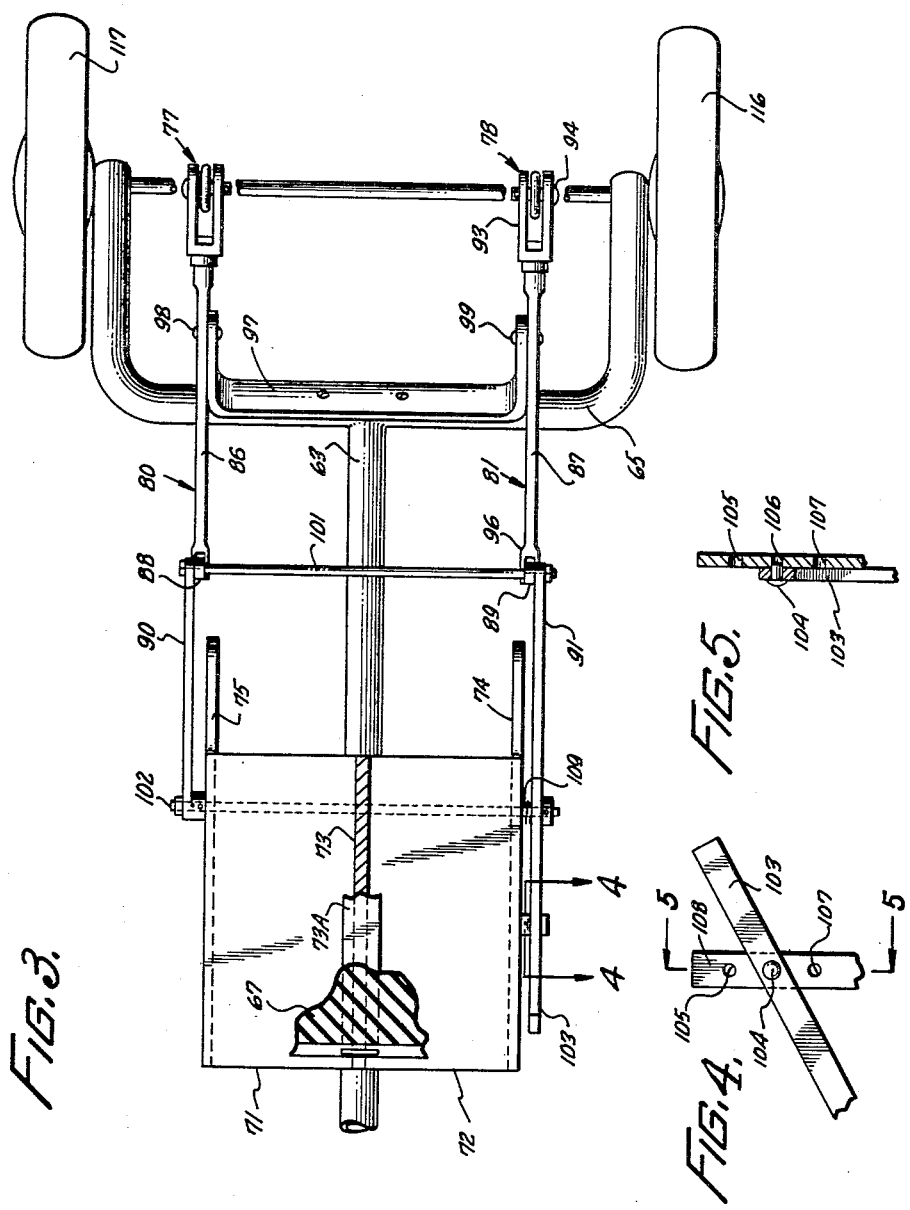

United States Patent Office 3,151,872
Patented Oct. 6, 1964

3,151,872
CHILD'S ROCKING VEHICLE WITH FIGURE SIMULATION
Harm A. Weber, Sr., Tuck-A-Way Trailer Park, R.R. 2, Metamora, Ill.
Original application Feb. 15, 1960, Ser. No. 8,677, now Patent No. 3,075,782, dated Jan. 29, 1963. Divided and this application Jan. 25, 1963, Ser. No. 253,837
2 Claims. (Cl. 280—1.11)

This invention relates to a vehicle for children, particularly of the wheel supported type having a movable occupant supporting replica of a figure thereon.

This application is a division of my prior and co-pending application Serial Number 8,677, filed February 15, 1960, issued January 29, 1963, as Patent 3,075,782.

Children like motion. They are, in general, attracted to vehicles which they can occupy and use to propel themselves from place to place, as, for example, the concentional child's pedal operated tricycle. Children also, in general, like replicas of figures which are appealing to childish imagination, such as a horse, "rocket ship," bird, airplane, or the like, and particularly like to ride such replicas and cause motion thereof as, for example, the conventional spring supported hobby horse.

My invention combines in a single vehicle the characteristics described above which are appealing to children, namely, a vehicle which the child can use to transport himself, a replica of a figure which is appealing to childish imagination and which the child can ride, and movement of such replica as such, as distinguished from the movement of the vehicle as a whole.

The apparatus of the invention is a vehicle for a child which is supported by a plurality of rotatable wheels, has movable support means for supporting a rider of the vehicle in the form of a replica of a figure appealing to childish imagination, has means for rotating the wheels of the vehicle, and has means responsive to rotation of the wheels which oscillate the support means relative to the vehicle. As a consequence, a child may occupy the vehicle and use it to transport himself from place to place and at the same time enjoy oscillatory movement of the means which supports him on the vehicle. Moreover, the child's enjoyment of the vehicle is further enhanced because the means which supports him on the vehicle is a replica of a figure appealing to childish imagination.

This invention will be more clearly understood by reference to the following detailed description thereof taken in conjunction with the accompanying drawings, in which:

FIG. 3 is a partial plan sectional view of the embodiment shown in FIG. 1 taken along the line 3—3 in FIG. 1;

FIG. 4 is a fragmentary view taken along the line 4—4 in FIG. 3; and

FIG. 5 is a sectional view taken along the line 5—5 in FIG. 4.

Figures 1, 2:
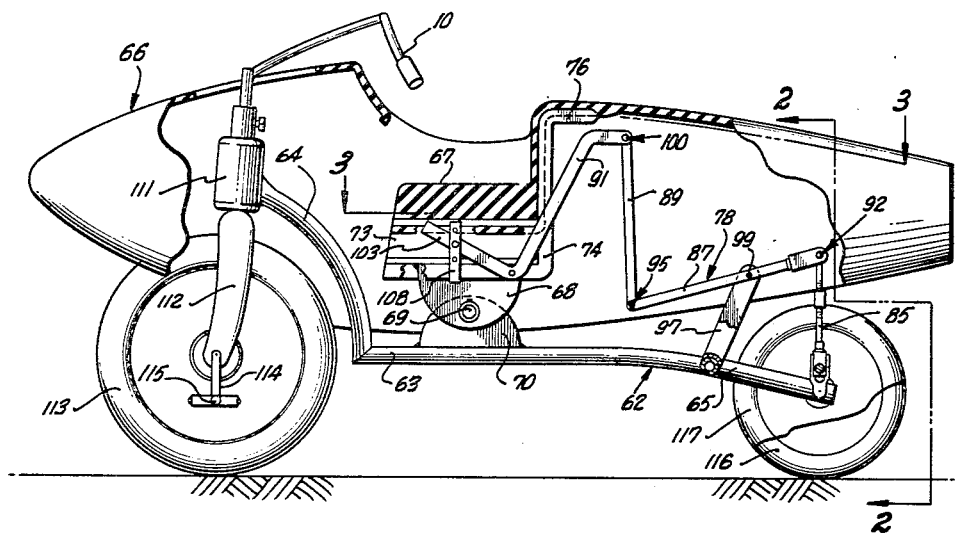
FIG. 1 is an elevational side view partially broken away along a longitudinal section of another embodiment of the invention.
FIG. 2 is an elevational end view partially in section of the embodiment shown in FIG. 1 taken along the line 2—2 in FIG. 1.

Referring now to FIG. 1, the vehicle shown has a vehicle frame 62. The single support member 63 is connected to the steering boss 111 by an upwardly extending portion 64, the remainder of the support member 63 being substantially horizontal. Also, a rear fork 65 of the frame extends slightly downwardly from the single support member. A pivot plate 70 is rigidly attached substantialy vertically to the support member 63, such as by welding, at a position intermedaite the ends of the vehicle frame 62. If desired, the pivot plate may be adjustably attached to the vehicle frame by means of a support post and support means boss in the same manner as heretofore explained for the embodiment shown in FIG. 1 of Patent 3,075,782 referred to above.

Support means 66 is here exemplified by a replica of a projectile-like figure adapted to support a child rider of the vehicle at 67. It includes a pivot fork 68 which sandwiches and is pivotally attached to a pivot plate 70 by means of a pivot pin 69. The pivot fork 68, pivot pin 69 and pivot plate 70 are identical to the similar elements 19 through 22 described for the embodiment shown in FIG. 1 of Patent 3,075,782. The pivot fork 68 is attached to the portion 67 of the support means 66 any manner desired, which may be, as shown in FIGS. 1, 2, and 3, a rigid attachment, as by welding, of the pivot fork to a T section which has flanges 71 and 72 extending outwardly and transversely of the pivot fork and longitudinally of the axis of the pivot pin and also has a central web 73 which extends vertically upwardly and normally of the axis of the pivot pin and is fastened to the portion 67 by means of a flange 73A embedded in the replica or riveted thereto. A pair of members 74, 75 are rigidly attached to the outer extremities of the flanges 71 and 72 and are equally spaced from the pivot plate 70. The members 74, 75 each extend along the underside of the full length of the flanges 71 and 72 and upwardly along the back of the seat portion 67 to provide reinforcement for the back of the seat and then at 76 extend to the rear of the vehicle along the underside of the top rear portion of the replica to provide reinforcement therefor against the contingency of a second child climbing on the rear top portion of the replica while engaging in playful antics with a child seated on the portion 67. The reinforcing extension 76 of each of the members 74 and 75 may be extended as far back along the replica as is thought necessary and is suitably attached to the replica by embedment therein or rivets. The replica is suitably cut away so that it can arcuately move about the pivot pin 69 without interference from the remainder of the vehicle and so that a child seated at 67 can reach the pedal crankpins, as 115, with his feet.

As best shown in FIGS. 1, 2, and 3, two connecting means 77, 78 extend between the support means and the rear shaft 79 and are connected to both thereof. The two connecting means are identical, except as stated to the contrary. Each connecting means 77, 78 is comprised of rigid link means and an eccentric connection of the link means to the rear shaft 79 eccentrically of the axis of rotation thereof. Each eccentric connection 82, 83 is identical in construction to the described eccentric connection 30 of the apparatus shown in FIG. 1 of Patent 3,075,782. The two eccentric connections 82, 83 are angularly aligned about the axis of rotation of the rear shaft and are spaced from each other longitudinally of the axis of the rear shaft and equally transversely of the pivot plate 70 on opposite sides thereof. The connecting means 77 and 78 each include rigid link means 80, 81. Each rigid link means 80, 81 is comprised of a connecting rod 84, 85, actuating levers 86, 87, connecting links 88, 89, and actuating arms 90, 91, respectively. The construction of the connecting rod is the same as that of the connecting rod 40 described for the embodiment shown in FIG. 1 of Patent 3,075,782. Each connecting rod is pivotally connected at its end remote from the rear axle to an aligned actuating lever, as at 92 (FIG. 1). As shown in FIG. 3, each pivotal connection 92 may be in the form of a clevis 93 on the end of the actuating lever in which the eye of the connecting rod is disposed to be pivotally connected thereto by means of a clevis pin 94 which extends through the clevis and the eye of the connecting rod. The other end of each actuating lever is pivotally attached to an aligned connecting link, as at 95 (FIG. 1). The end of the actuating lever may be in the form of a clevis 96 in which the connecting link is disposed. The two pivotal connections 95 may be formed with a separate pivot pin at each pivot, but preferably, a continuous bar 101 (see FIG. 3 regarding the connection of the connecting links to the actuating arms) extending transversely of the vehicle frame is used to effect the two pivot connections, in order to inhibit any tendency of the two pivots to move other than synchronously. A U shaped bracket 97 is attached at its back to the rear fork 65 with its legs extending upwardly. Each leg of the bracket 97 is suitably aligned with one of the actuating levers for pivotal attachment of the two by means of pivot pins 98 and 99. The relative extensions of the actuating lever on each side of its pivotal connection to the bracket 97 determines the amount of magnification of the movement applied by the connecting rod to the pivot connection 92, the preferred ratio being two to one, so that, in FIG. 1, the length of the actuating lever from its pivotal connection 99 to its pivotal connection 95 is twice its length from the pivotal connection 99 to the pivotal connection 92. Each connecting link extends upwardly and is pivotally connected, as at 100 (FIG. 1), to the correspondingly aligned actuating arm. As shown in FIG. 3, the pivotal connection of the pair of connecting links to the actuating arms preferably is made to a bar 101 which connects together the pair of connecting means 77, 78 and assures that they operate synchronously. The two pivotal connections between the actuating arms and the connecting links are made in the same manner as heretofore described for the pivotal connections between the connecting links and the actuating arms. Each actuating arm has a portion extending downwardly from its pivotal connection to the connecting link which extends to and is fixed to an end of the shaft 102. The shaft 102 extends transversely of the vehicle frame and substantially parallel to the axis of the pivot pin 69 through and exteriorly of the support members 74, 75 and is slidably and rotatively journaled therein, so that rotation of the actuating arm rotates the shaft and it may slide in its bearings longitudinally of its axis. The actuating arms are fixed to the shaft 102 in conventional manner, such as a set screw registering in a hole in the shaft or suitable keys between the actuating arm and the shaft. The actuating arms 90, 91 are identical in their extent between the shaft 102 and their pivotal connections to the connecting links. They differ in that the actuating arm 91 has an upwardly extending actuator handle 103 attached to it in the vicinity of its connection to the shaft 102. It is preferred that the actuator handle 103 be formed integrally with the remainder of the actuating arm, as is shown in FIG. 1.

By arcuately moving the actuator handle about the axis of the shaft 102, the support means 66 is moved about the pivot pin 69, thereby changing the limiting angular orientation of the support means relative to the vehicle frame within which it is free to oscillate about the pivot 69 responsively to rotation of the rear shaft 79. The actuator handle 103 is adapted so that it can be operated by an occupant of the vehicle seated on the portion 67 of the replica. As shown in FIGS. 4 and 5, the actuator handle is releasably secured against movement by the registering of a stop pin 104 in one of the spaced holes 105, 106 and 107 formed in a bracket 108 which is rigidly attached to the support member 74. The stop pin 104 is secured to the actuator handle so that it will not be lost. Registry of the stop pin 104 in a particular hole in the bracket 108 is maintained by means of a compression spring 109 interposed between the support member 74 and the actuating arm 91 which urges the actuator handle outwardly against the bracket. The stop pin 104 may be removed from a particular hole and moved to register in a different hole by a slight pull on the actuator handle laterally away from the bracket 108 which, due to the slidability of the shaft 102, resiliency of the actuating arm 91 and the working play in the pivotal connection 100, displaces the actuator handle inwardly toward the center of the vehicle sufficiently to disengage the stop pin from the hole in the bracket 108. This adjustment of the angular orientation of the support means relative to the frame is advantageous because it would undoubtedly be appealing to childish imagination in that a child, by adjusting the angle, could imagine that he was descending when the forward part of the support means was tipped downwardly or ascending when the forward part of the support means was tipped upwardly. Alternatively, other means may be used to achieve the function of the stop pin 104 and the bracket 108, such as a conventional ratchet engaging teeth in the actuator handle.

If desired, a suitable support link may be extended between and pivotally connected to each portion 76 of the members 74, 75 and the aligned actuating arms 90, 91 to provide additional support for the top rear portion of the replica.

The remainder of the embodiment shown in FIGS. 1 through 5, particularly the handlebar 110, steering boss 111, steering fork 112, vehicle supporting wheels 113, 116 and 117, pedal cranks 114, pedal crankpins 115, front shaft, and rear shaft 79 are all the same as the described corresponding items in the apparatus shown in FIG. 1 of Patent 3,075,782.

It is apparent that a rider seated at 67 may steer the vehicle by means of the handlebar 110 and rotate the front wheel 113 by means of contact of his feet with the pedal crankpins associated with the front wheel 113. The rotation of the front wheel 113 would cause the vehicle to move linearly, thus rotating the rear wheels 116 and 117 which, through the connecting means 77 and 78, will arcuately oscillate the support means about the pivot pin 69 in a plane transverse to the axis of rotation of the rear axle 79 and parallel to the plane of rotation of the rear wheels.

The inventive concept would include a vehicle having a plurality of supporting wheels greater than three, such as a four-wheeled vehicle. Moreover, various changes could be made in the connecting means which causes the support means to move or oscillate relative to the vehicle frame responsively to rotation of the wheels of the vehicle, as, for example, the rotation of the rear shaft 79 could be geared or chain and sprocket connected to a rotatable countershaft which would have the eccentrics fixed to it.

The invention is not to be understood to be restricted to the details set forth above since these may be modified within the scope of the appended claims without departing from the spirit and scope of the invention.

What is claimed is:

1. In a vehicle for a child, a vehicle frame having a plurality of vehicle supporting wheels journalled thereon, a shaft extending transversely of the frame and journalled therein, said shaft being fixed at each end to one of said vehicle supporting wheels so that rotation of the wheels rotates the shaft, support means for supporting a rider of the vehicle, said support means including a three dimensional replica of a figure, pivot means for pivotally mounting the support means on the frame for movement of the replica about a pivot axis only in a plane perpendicular to the shaft, means for rotating the wheels adapted to be actuated by the rider, a pair of double crank means fixed to and extending radially from the shaft intermediate the wheels fixed to the shaft, each double crank means having a pair of angularly aligned cranks spaced from each other and a crank pin radially spaced from and substantially parallel to the shaft extending between and connecting together the pair of cranks, rigid link means extending between and connected to the support means and to the crank pin of each double crank means, actuation of the means for rotating the wheels by a rider of a vehicle rotating the wheels and rotating each crank pin about the axis of the shaft and imparting arcuate oscillatory movement to the support means about the pivot axis of the pivot means, and means connected between the link means and support means for varying the limits of oscillatory motion of the support means relative to the vehicle frame and comprising a pivotal connection of the link means to the support means, the link means defining an extension beyond the pivotal connection, bracket means secured rigidly to the support means adjacent the extension, and means for connecting the extension to the bracket means in one of a plurality of positions relative to the bracket means.

2. A vehicle according to claim 1 wherein the means for connecting the extension to the bracket includes a plurality of apertures through the bracket means at spaced apart locations of the bracket, an aperture through the extension, and a stop pin movably engageable within the extension aperture and one of the bracket means apertures.

References Cited in the file of this patent

UNITED STATES PATENTS

| | | |
|---|---|---|
| 361,581 | Ellis | Apr. 19, 1887 |
| 1,088,185 | Swender | Feb. 24, 1914 |
| 1,317,475 | Bell | Sept. 30, 1919 |
| 1,506,726 | Alexander | Aug. 26, 1924 |
| 1,519,493 | Harker | Dec. 16, 1924 |